S. SANO.
BALANCER.
APPLICATION FILED AUG. 22, 1916.

1,237,559.

Patented Aug. 21, 1917.

Inventor:
Shiro Sano.
By B. Singer
Atty.

UNITED STATES PATENT OFFICE.

SHIRO SANO, OF TOKYO, JAPAN.

BALANCER.

1,237,559.

Specification of Letters Patent.  Patented Aug. 21, 1917.

Application filed August 22, 1916. Serial No. 116,383.

*To all whom it may concern:*

Be it known that I, SHIRO SANO, engineer, of No. 26 Sekiguchi Daimachi, Koishikawa-Ku, city of Tokyo, Empire of Japan, have invented certain new and useful Improvements in Balancers, of which the following is a specification.

The object of this invention is to get a correct result, by the aid of a special instrument (to be called the "balancer" hereafter), in the measurement of the resistance of the ground when the measurement is done with the Wheatstone bridge or any other instrument constructed under similar principle.

The principle of the "balancer" is to give, between the earth-plates and the Wheatstone bridge or any other instrument of similar nature, an equal and opposite electro-motive-force (for brevity E. M. F. hereafter) to that due to the current existing in the ground, and in this way to nullify the disturbing effect of the earth current.

Figure 1:
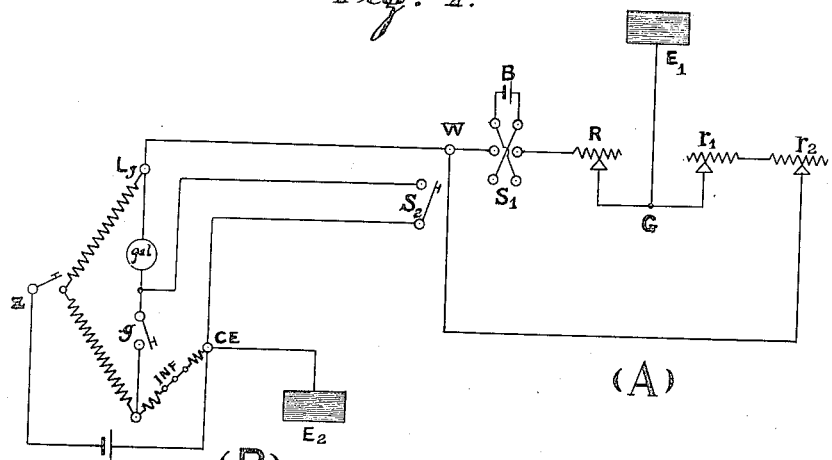

In the accompanying drawing, Figure 1 shows the diagram of connections used in this invention, wherein (B) represents the Wheatstone bridge of ordinary construction, and (A) represents the diagram of connections of the "balancer".

Figure 2:
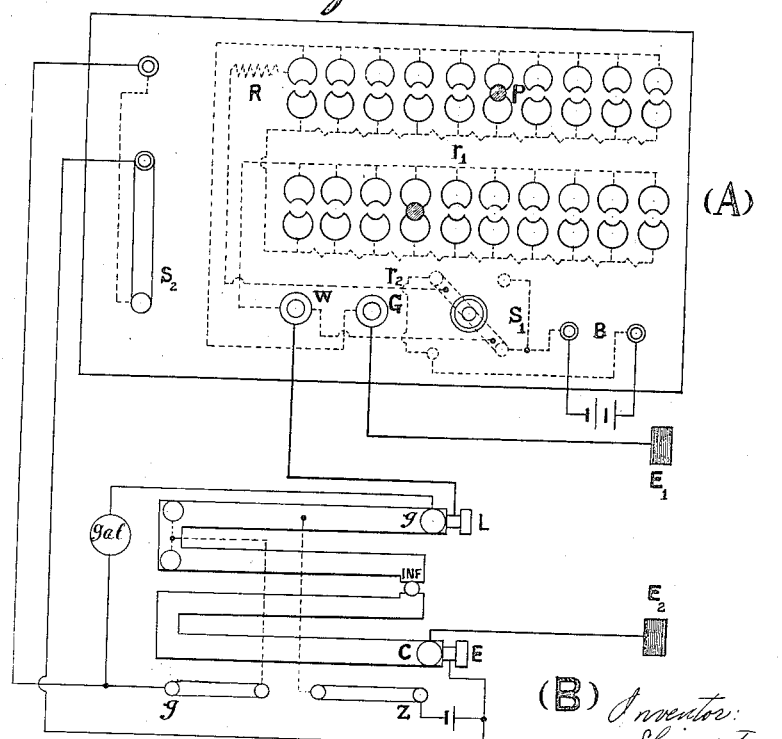

Fig. 2 shows an example of the actual instrument constructed under the principle above mentioned.

In both figures, Fig. 1 and Fig. 2, the same letters indicate the same parts respectively.

Consider the closed circuit W B R G $r_1$ $r_2$ W, Fig. 1, where R, $r_1$ $r_2$ are resistances, B a battery, $S_1$ a change-over switch. By changing the ratio of R to $(r_1+r_2)$ the potential difference between W and G may be changed at will. Moreover, by changing the polarity of B the direction of potential acting between W and G may be changed. $r_1$ is used for a rough adjustment and $r_2$ a fine adjustment of the potential difference. R is a large resistance compared with $(r_1+r_2)$ and may or may not be adjustable. $E_1$ and $E_2$ are two earthplates, between which an E. M. F. due to earth-current acts. The artificial potential difference produced between W and G, by the arrangement shown, also acts between $E_1$ and $E_2$, and thus may be made to counterbalance the E. M. F. of earth current by suitable adjustment of the ratio of R to $(r_1+r_2)$ and by the proper polarity of B.

$S_2$ is an electric key which is usually open and may be closed only by pressing down by the finger. The purpose of this key will be made clear when the use of the instrument is explained as follows:—

The necessary connections are made as shown in Fig. 1. The keys $g$ and $z$ are opened at first, while the plug (INF) is taken off. $S_2$ is then closed. This will make a path for current to flow through the galvanometer (gal), the complete circuit being $E_1$—G—W—$L_g$—gal—$S_2$—CE—$E_2$—$E_1$.

The current flowing through the above circuit is due to the resultant effect of the earth E. M. F. and the E. M. F. due to the battery B acting on the combination of R and $(r_1+r_2)$. By adjusting the ratio of R to $(r_1+r_2)$ properly and by giving proper polarity to B by means of $S_1$, the current through the (gal) may be made *nil*, when the counterbalancing of the earth-current is made perfect.

Keeping this condition, open $S_2$ and plug in (INF). This will restore the connection to the common connections of Wheatstone bridge method of measuring resistances. Under this condition measure the resistance between $E_1$ and $E_2$ by the usual method. The resistance measured is the sum of the following: the contact resistance of $E_1$ and $E_2$ with the earth respectively, the resistance of the earth itself between the earth-plates, the resistance of the connecting conductors, the internal resistance of the "balancer".

The internal resistance of the "balancer" can be made to be known at once on the surface of the instrument; for, by selecting R very large compared with $(r_1+r_2)$ the combined resistance of the parallel circuit between W and G is approximately equal to $(r_1+r_2)$. The error arising from this approximation may be made smaller by making R larger.

In this way the internal resistance is approximately equal to $(r_1+r_2)$ and thus can be indicated very easily on the surface of the instrument by any proper way. To apply this balancer method to practical measurement, reference is made to the usual "three-ground-method". The method of calculation of the final result is essentially equal to that of the usual three-ground-method, the only difference being the proper disposal of the internal resistance of the "balancer" which is very simple. The result attained by this new method is vastly better than the ordinary method of Wheatstone bridge and galvanometer, since in this new method the disturbing effect of the earth-current is perfectly counter-balanced.

Having now fully described my invention, what I claim and desire to protect by Letters Patent of the United States is:—

The "balancer" which consists of two resistances, one of which being large compared with the other and provided with a source of E. M. F. in it, in parallel; the outside connections being made at the two ends of the parallel circuit, the ratio of the two resistances being adjustable.

In testimony whereof I affix my signature in presence of two witnesses.

SHIRO SANO.

Witnesses:
 H. F. HAWLEY,
 HARNTADA YASUMARA.